United States Patent
Dai et al.

(10) Patent No.: US 10,762,139 B1
(45) Date of Patent: Sep. 1, 2020

(54) METHOD AND SYSTEM FOR MANAGING A DOCUMENT SEARCH INDEX

(71) Applicant: EMC IP Holding Company LLC, Hopkinton, MA (US)

(72) Inventors: Hongtao Dai, Shanghai (CN); Lei Zhang, Shanghai (CN); Chao Chen, Shanghai (CN); Kunwu Huang, Shanghai (CN); Jingjing Liu, Shanghai (CN); Ying Teng, Pleasanton, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 460 days.

(21) Appl. No.: 15/279,818

(22) Filed: Sep. 29, 2016

(51) Int. Cl.
*G06F 16/00* (2019.01)
*G06F 16/93* (2019.01)
*G06F 16/22* (2019.01)

(52) U.S. Cl.
CPC .......... *G06F 16/93* (2019.01); *G06F 16/2246* (2019.01)

(58) Field of Classification Search
CPC ........... G06F 17/30321; G06F 17/2247; G06F 17/30911; G06F 3/0643; G06F 17/2229; G06F 17/30162; G06F 17/30327; G06F 17/3089; G06F 17/30997; G06F 17/30135; G06F 17/30616; G06F 17/30619

See application file for complete search history.

(56) References Cited

U.S. PATENT DOCUMENTS

| | | | | |
|---|---|---|---|---|
| 7,644,097 B2 * | 1/2010 | Yamamoto | ............ | G06F 16/319 |
| | | | | 707/999.101 |
| 8,060,619 B1 * | 11/2011 | Saulpaugh | .......... | H04L 67/1078 |
| | | | | 709/227 |
| 2005/0005089 A1 * | 1/2005 | Eckhart | ................. | G06F 9/4812 |
| | | | | 712/244 |
| 2010/0030752 A1 * | 2/2010 | Goldentouch | .......... | G06F 16/81 |
| | | | | 707/797 |
| 2010/0161569 A1 * | 6/2010 | Schreter | ............. | G06F 16/2272 |
| | | | | 707/696 |
| 2011/0093462 A1 * | 4/2011 | Meyer | ............... | G06F 17/30705 |
| | | | | 707/736 |
| 2011/0246470 A1 * | 10/2011 | Negrassus | ......... | G06F 17/30312 |
| | | | | 707/741 |

(Continued)

FOREIGN PATENT DOCUMENTS

| | | | | | |
|---|---|---|---|---|---|
| EP | | 2778964 B1 * | 5/2017 | ....... | G06F 17/30162 |
| WO | WO-2004010335 A1 * | | 1/2004 | ........ | G06F 17/30911 |

*Primary Examiner* — Augustine K. Obisesan
(74) *Attorney, Agent, or Firm* — Chamberlain, Hrdlicka, White, Williams & Aughtry

(57) ABSTRACT

A method for managing a document search index. The method includes obtaining indexing terms for documents in a document repository to generate search index fragments, storing the search index fragments in a document search index, and constructing a hierarchical structure from a first set of stored search index fragments. The selected first set of search index fragments is arranged by size, in the hierarchical structure. The method further includes selecting, based on a minimal size, a second set of stored search index fragments from the hierarchical structure, merging the second set of stored search index fragments to obtain a larger search index fragment, storing the larger search index fragment in the document search index, and serving at least one search request using the larger search index fragment.

20 Claims, 7 Drawing Sheets

(56) References Cited

U.S. PATENT DOCUMENTS

| | | | |
|---|---|---|---|
| 2012/0254148 A1* | 10/2012 | Xiao | G06F 17/30312 |
| | | | 707/708 |
| 2012/0284276 A1* | 11/2012 | Fernando | G06F 16/41 |
| | | | 707/741 |
| 2013/0138698 A1* | 5/2013 | Harada | G06F 21/6254 |
| | | | 707/797 |
| 2014/0164388 A1* | 6/2014 | Zhang | G06F 17/30911 |
| | | | 707/742 |
| 2016/0117352 A1* | 4/2016 | Kurokawa | G06F 17/30991 |
| | | | 707/797 |
| 2017/0270146 A1* | 9/2017 | Harrison | G06F 7/14 |

* cited by examiner

FIG. 5A
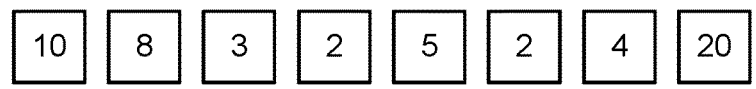
FIG. 5B1
FIG. 5B2
FIG. 5B3
FIG. 5B4
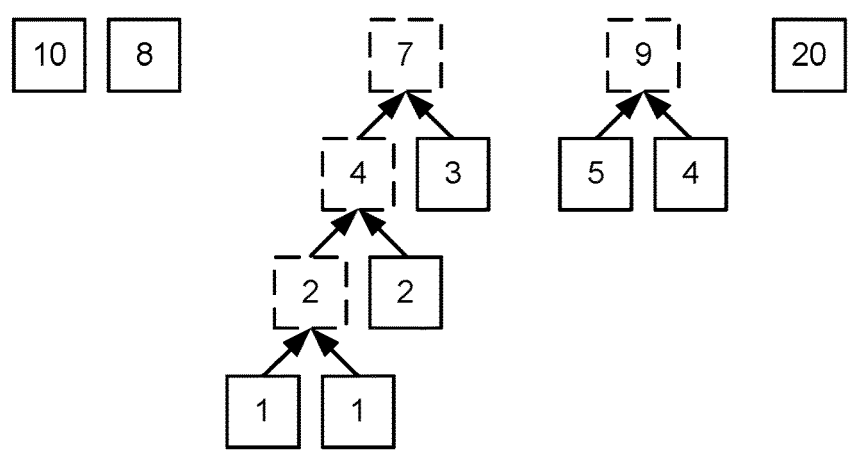
FIG. 5C1
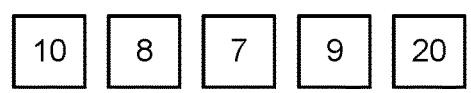
FIG. 5C2

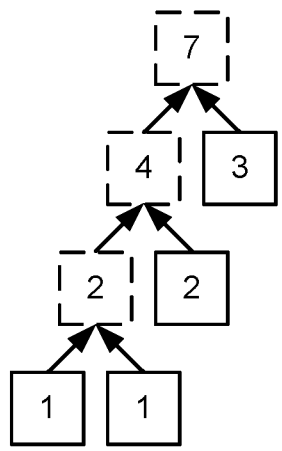
FIG. 5D1
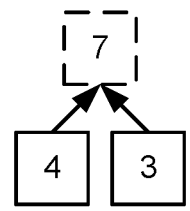
FIG. 5D2
FIG. 5D3
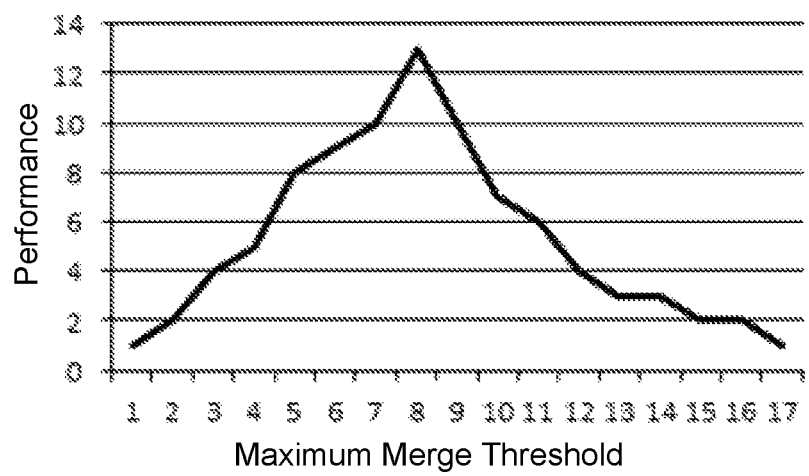
FIG. 5D4

METHOD AND SYSTEM FOR MANAGING A DOCUMENT SEARCH INDEX

BACKGROUND

A significant amount of content is stored in document repositories. Frequently, documents in a document repository are indexed to facilitate and/or accelerate searches for documents. A document search index may thus need to be constructed prior to performing a document search.

BRIEF DESCRIPTION OF DRAWINGS

FIGS. 5A-5D4 show exemplary search index fragments in an exemplary document search index, in accordance with one or more embodiments of the technology.

DETAILED DESCRIPTION

Specific embodiments of the technology will now be described in detail with reference to the accompanying figures. In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

In the following description of FIGS. 1-6, any component described with regard to a figure, in various embodiments of the technology, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the technology, any description of the components of a figure is to be interpreted as an optional embodiment, which may be implemented in addition to, in conjunction with, or in place of the embodiments described with regard to a corresponding like-named component in any other figure.

In general, embodiments of the technology relate to a method and system for managing a document search index. The document search index may be used to facilitate and/or accelerate searches for documents. Rather than having to parse individual documents in a document repository to identify documents that match a search query, the document search index may be consulted to efficiently identify documents that match the search query. The document search index may include indexing terms that characterize the documents in the document repository. Building and managing the document search index, as subsequently described, thus is a prerequisite for performing document searches.

Figure 1:
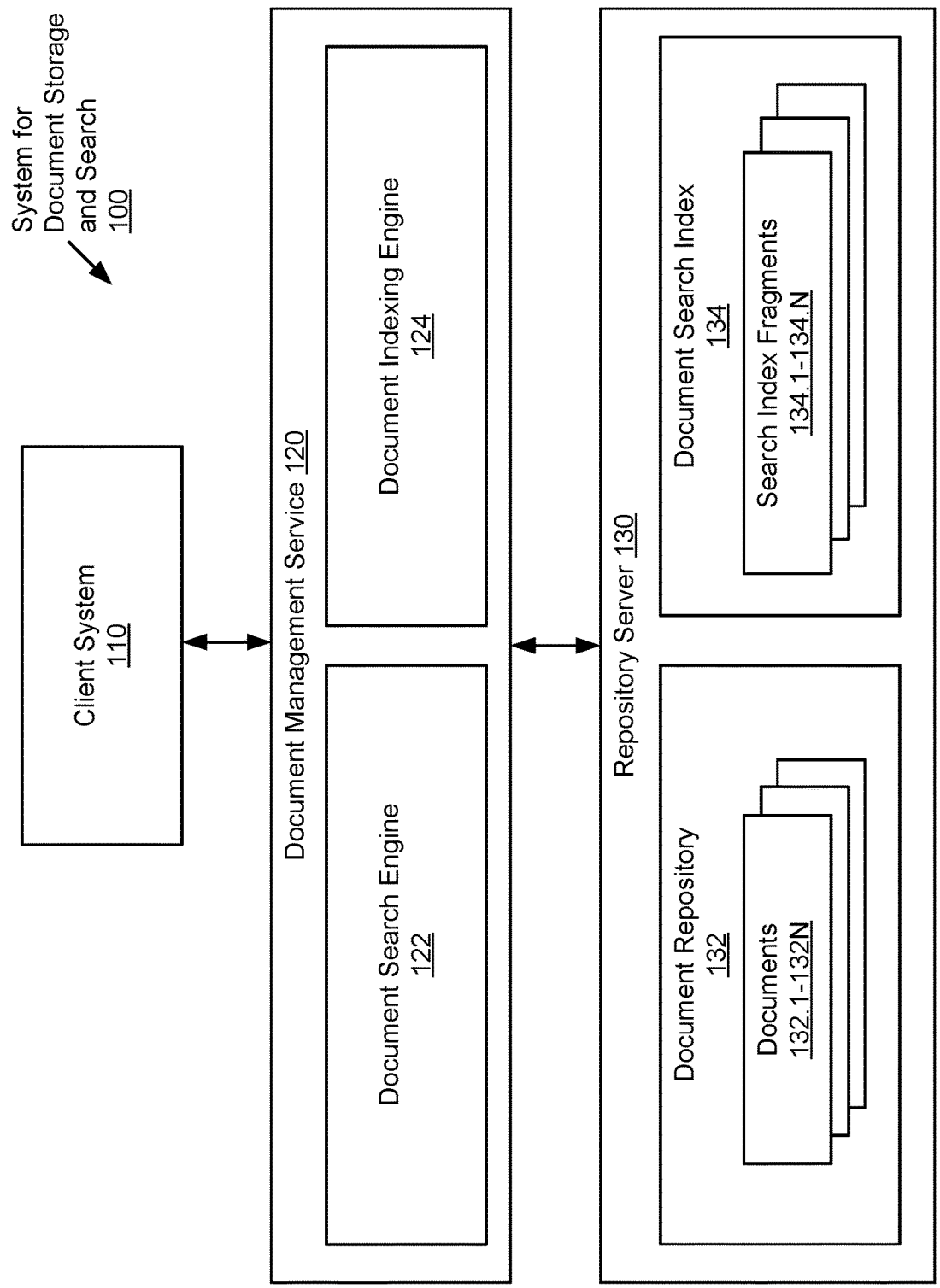
FIG. 1 shows an exemplary system for document storage and search, in accordance with one or more embodiments of the technology.

FIG. 1 shows an exemplary system for document storage and search, in accordance with one or more embodiments of the technology. The system includes a client system (110) (or multiple client systems), a document management service (120), and a repository server (130). The aforementioned components may communicate with each other using any known or later discovered communication protocol. Further, the aforementioned components may communicate using any combination of wired and/or wireless connections and wired and/or wireless networks. Each of the aforementioned components is described below.

In one embodiment of the technology, a client system (110) corresponds to any computing system (see e.g., FIG. 6) that includes functionality to issue document search requests (also referred to as queries) to the document management service (120) and to receive a corresponding response(s) from the document management service after the request has been serviced.

Figure 2:
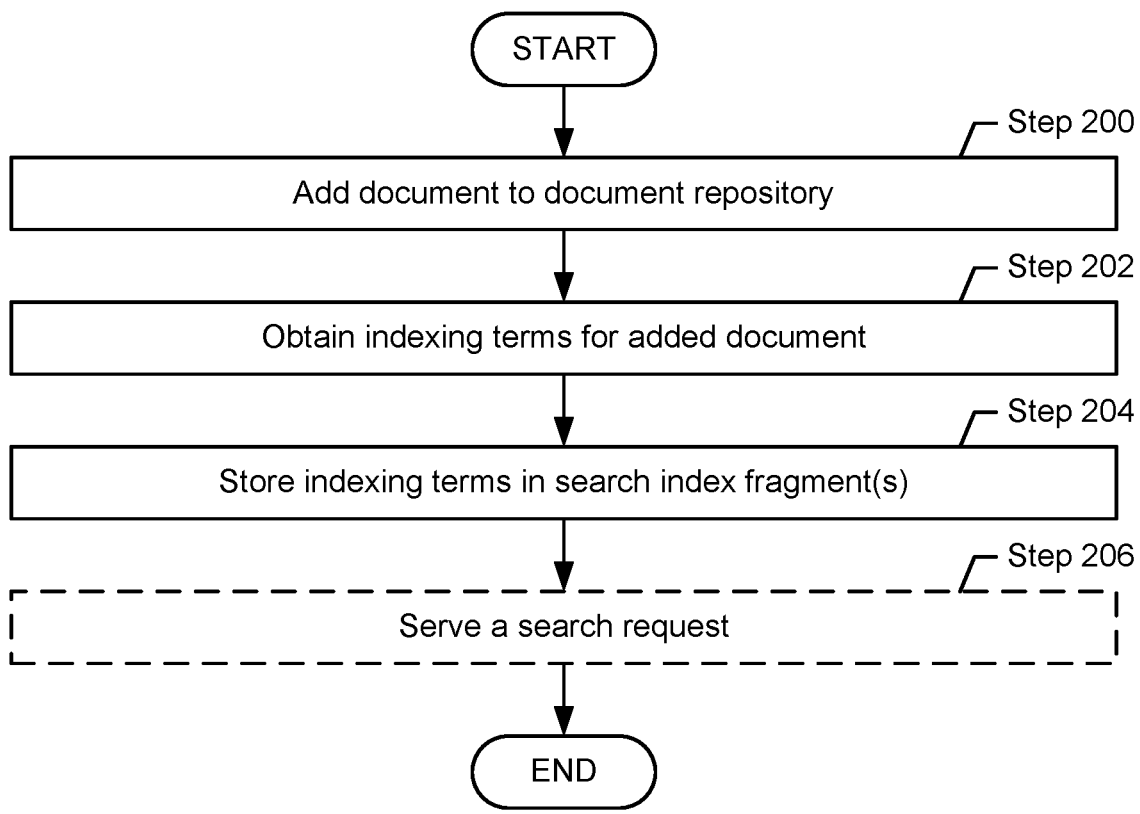
FIG. 2 shows a method for archiving a document in a document repository, in accordance with one or more embodiments of the technology.
Figure 3:
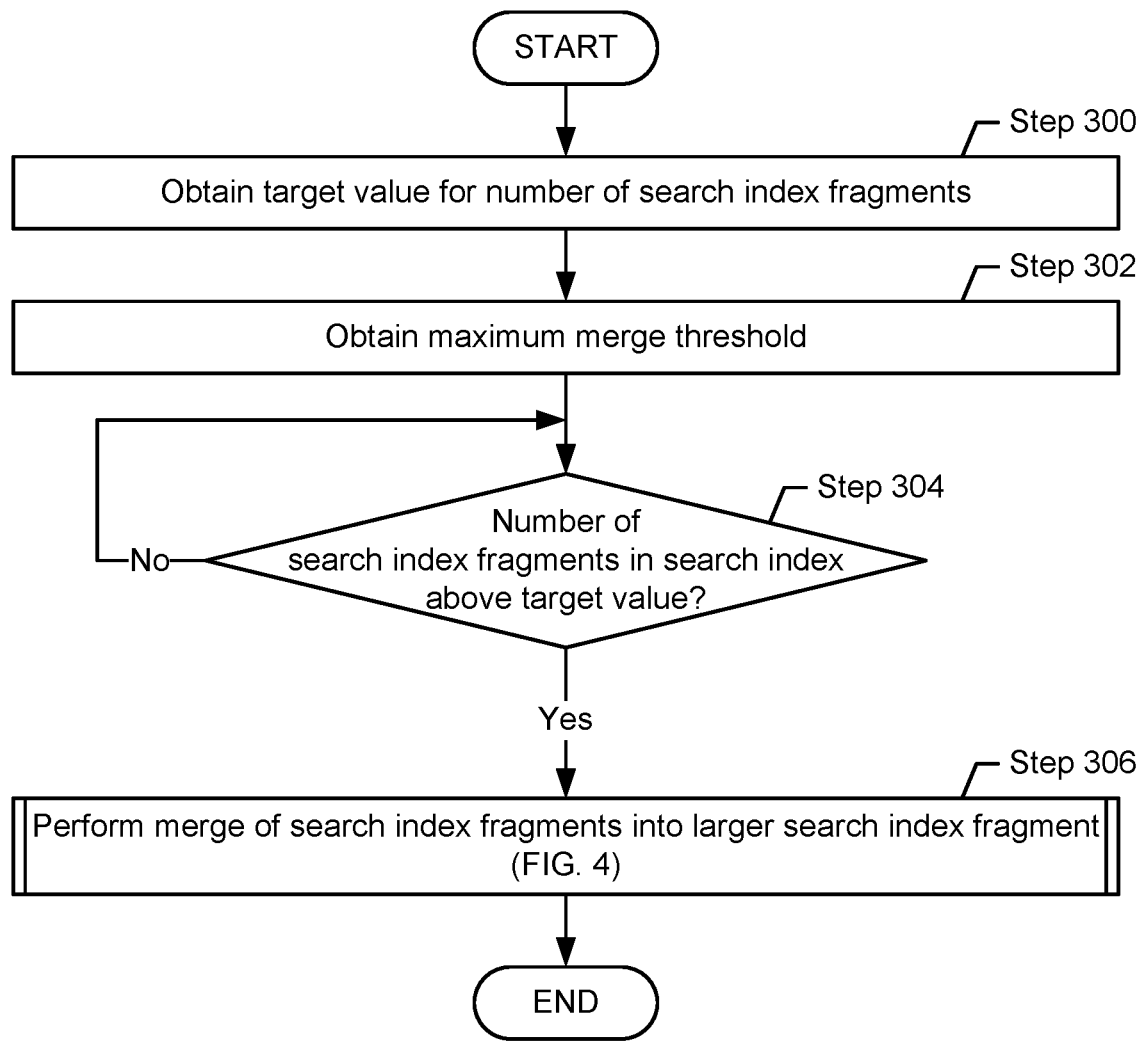
FIG. 3 shows a method for generating a document search index, in accordance with one or more embodiments of the technology.
Figure 4:
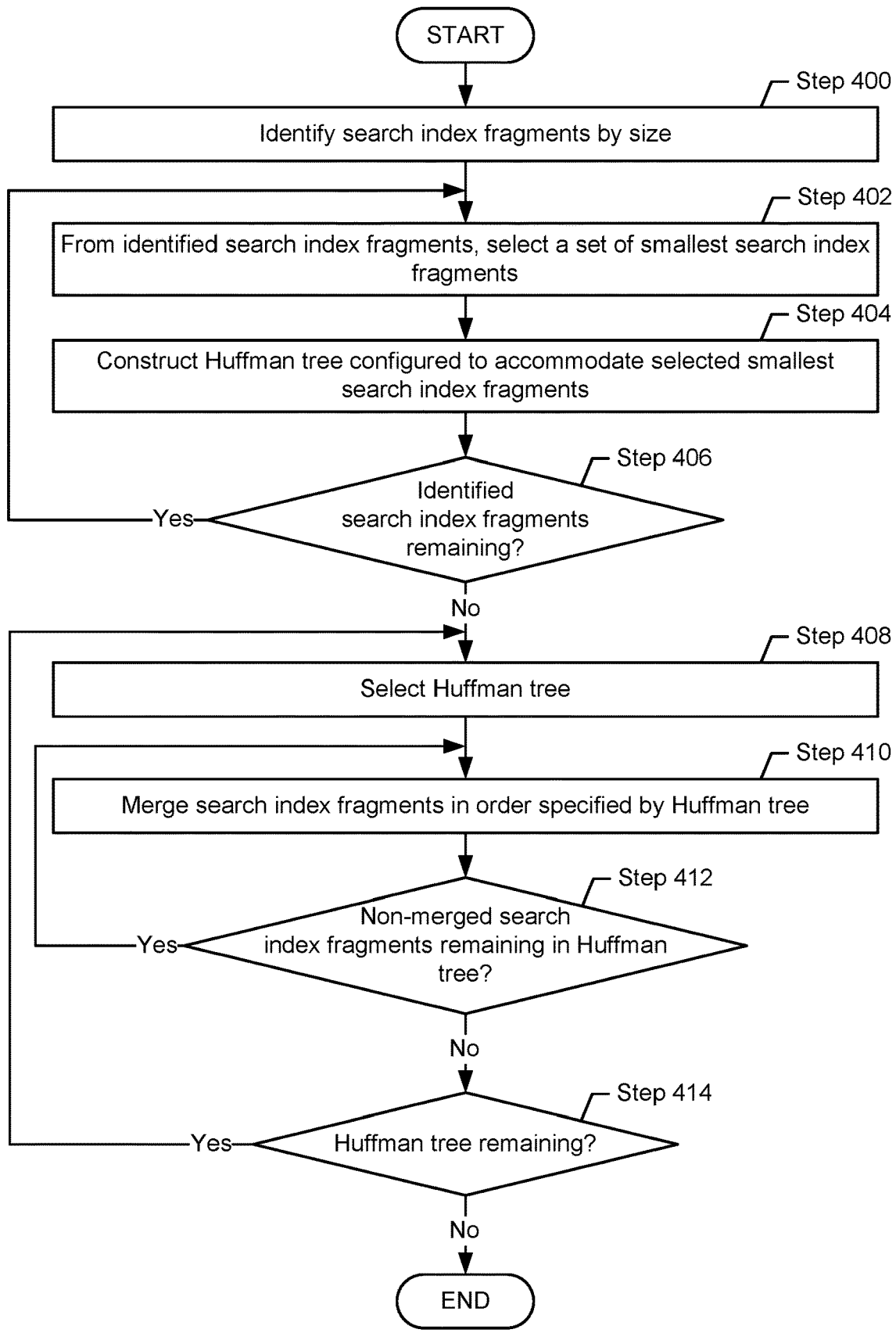
FIG. 4 shows a method for generating, from small search index fragments in the document search index, a larger search index fragment, in accordance with one or more embodiments of the technology.

Continuing with the discussion of FIG. 1, the document management service (120) includes functionality to perform all or a portion of the methods shown in FIGS. 2-4. The document management service may also include functionality to perform various actions (e.g., read, write, delete, modify, send, etc.) on the objects stored in the document repository (132) and/or the document search index (134), when servicing requests from the client system and/or requests issued by another party, e.g., an administrator. The document management service may be implemented using one or more computing systems (see e.g., FIG. 6).

The document management service, in accordance with one or more embodiments of the technology, includes a document search engine (122), and a document indexing engine (124).

The document search engine (122), in accordance with one or more embodiments of the technology, identifies documents, in the document repository (132), that match a user-specified search query. The document search engine (122) may further perform additional functions such as determining whether the requesting user is authorized to access the identified documents. The search being performed by the document search engine (122) in one or more embodiments of the technology, is an indexed document search. Accordingly, the document search engine (122) may access the document search index (134) when performing a search for documents in the document repository (132).

The document indexing engine (124), in accordance with one or more embodiments of the technology, indexes documents (132.1-132.N) that are stored in the document repository (132). The document indexing engine generates search index fragments (134.1-134.N) that include information obtained when indexing the documents. These search index fragments are stored in the document search index (134). Accordingly, the document indexing engine (124) may access the document search index (134) but also the document repository (132), when indexing documents that are stored in the document repository. To perform the indexing, the document indexing engine (124) executes software instructions in the form of non-transitory computer readable program code described in detail below, with reference to FIGS. 2-4.

Continuing with the discussion of FIG. 1, the repository server (130), includes functionality to store documents in a document repository (132) and to store document indexing information in the document search index (134). The document repository (132) and the document search index (134) may be hosted on any type of non-volatile (or persistent) storage, including, for example, a hard disk drive, NAND Flash memory, NOR Flash memory, Magnetic RAM Memory (M-RAM), Spin Torque Magnetic RAM Memory (ST-MRAM), Phase Change Memory (PCM), or any other memory defined as a non-volatile Storage Class Memory (SCM), a redundant array of independent disks (RAID), network attached storage (NAS), cloud storage, etc. Further, at least some of the content in the repositories (132, 134) may alternatively or in addition be stored in volatile memory, e.g., Dynamic Random-Access Memory (DRAM), Synchronous DRAM, SDR SDRAM, and DDR SDRAM.

The document repository (132) and/or the document search index (134) may be implemented using any format suitable for the storage of the corresponding entries in these repositories. One or more of these repositories may be, for example, a collection of text or binary files, spreadsheets, SQL databases etc., or any other type of hierarchical, relational and/or object oriented collection of data.

The document repository (132), in accordance with an embodiment of the technology, hosts a collection of documents (132.1-132.N) that may be searched upon request by a user. The documents in the document repository may include any type of content and may be text documents encoded in various formats, or hybrid documents including text content in combination with other, non-text content. In one or more embodiments of the technology, the documents in the document repository are indexed to facilitate and/or accelerate the search for documents. The resulting indexing data may be stored in the document search index, as subsequently described.

The document search index (134), in accordance with one or more embodiments of the technology, includes the indexing information for at least some of the documents (132.1-132.N) in the document repository (132). The indexing information, in accordance with an embodiment of the technology, is stored in search index fragments (134.1-134.N). Each search index fragment may be a file that includes content obtained from indexing one or more documents (132.1-132.N). The content in a search index fragment may include, for example, indexing terms, obtained from one or more documents, when indexing the document(s) as further described in FIG. 2. The indexing terms may be stored in the search index fragment in any format, for example as text. A search index fragment may further include other content. For example, a search index fragment may include counts that provide a cardinality for each indexing term, based on the number of instances of the indexing term found in the corresponding document. A search index fragment may further include other information, e.g., one or more identifiers of the document that the indexing terms were obtained from. Accordingly, a search index fragment may be a file or a database entry that serves as a container to hold indexing terms and potentially other additional information. In one or more embodiments of the technology, search index fragments vary in size, e.g., depending on how many indexing terms and/or other content is included in the search index fragments. The generation of search index fragments and their manipulation is further described below with reference to FIGS. 2-4.

The technology is not limited to the architecture of the system (100) shown in FIG. 1. Specifically, although FIG. 1 shows a single repository server (130), a single document repository (132) and a single document search index (134), those skilled in the art will appreciate that one or more of these elements may be distributed over multiple repositories, and that the repositories may be local and/or remote. Further, the system (100) may include any number of client systems (110).

FIGS. 2-4 show flowcharts in accordance with one or more embodiments of the technology. While the various steps in the flowcharts are presented and described sequentially, one of ordinary skill will appreciate that some or all of these steps may be executed in different orders, may be combined or omitted, and some or all of the steps may be executed in parallel. While FIG. 2 describes how a newly received document may be archived, FIGS. 3 and 4 describe the generation of a document search index, in accordance with one or more embodiments of the technology. The method of FIG. 2 may be executed independently from the methods of FIGS. 3 and 4. More specifically, a document may be added to the document repository at any time, while the generation of the document search index may also occur at any time, and independent from when a document is added to the document repository.

FIG. 2 shows a method for archiving a document in a document repository, in accordance with one or more embodiments of the technology. The method may be executed whenever a new document is stored in the document repository. The method as described may be performed for each document in the document repository in order to obtain a complete document search index that represents all documents in the document repository.

Turning to FIG. 2, in Step 200, a document is added to the document repository, e.g., by a user storing a document via the client system. The added document may be stored in the document repository.

In Step 202, indexing terms are obtained for the document that was added to the document repository. Indexing terms may be obtained by parsing the document and by identifying the most frequently occurring terms. Identifying indexing terms may require additional steps such as, for example, the removal of stop words from the document content. Stop words may be frequently occurring words such as, for example "the", "a" "to", etc. that may not serve as meaningful keywords for representing the document content in a document content identifier. Further, the document content may be stemmed, i.e., words or terms in the document may be replaced by the corresponding word stems. For example, the words "fishing", fished" and "fisher" may be reduced to the root word fish. Alternatively, lemmatization may be used to obtain the word stems.

Frequently occurring terms in the document may be considered indexing terms which may be obtained, for example, by generating a sorted list of the word stems. The list may only include terms that occur with at least a certain frequency.

In Step 204, the indexing terms are stored in one or more search index fragments in the document search index. The indexing terms may be accompanied by other information such as, for example, a cardinality determined for each of the indexing terms. The cardinality may be based on how frequently the indexing term exists in the document. Further, other information may be stored in the search index fragments, for example, an identifier of the document, to associate the search index fragment with the document.

In Step 206, after documents have been added to the document repository, and indexing terms for the documents have been stored in search index fragments, as described in Steps 200-206, a search request, submitted, e.g., by a user, may be served. The search request may be handled by the document search engine, which may perform the search by inspecting the indexing terms in the indexing fragments located in the document search index. A search may be performed at any time, e.g., during additional executions of the method described in FIG. 2, and/or during the execution of the methods described in FIGS. 3 and 4.

FIG. 3 shows a method for generating a document search index, in accordance with one or more embodiments of the technology. The method of FIG. 3 may execute at any time. For example, the method of FIG. 3 may execute as soon as a new search index fragment appears in the document search index, after the search index fragment is generated, as described in FIG. 2. Alternatively, the method may execute periodically, e.g., controlled by a scheduler, and/or whenever the processing load of the computing system that hosts the document management service is low, thus permitting the execution of the method of FIG. 3 as a background process.

Turning to FIG. 3, in Step 300, a target value for the number of search index fragments is obtained. The target value specifies how many search index fragments should be included in the document search index, in accordance with an embodiment of the technology. When performing a search, querying a document search index with an excessive number of small search index fragments may be slow and may require significant resources of the computing system that hosts the document management service and/or of the repository server. In one or more embodiments of the technology, the target value is thus intended to limit the number of search index fragments to the specified target value in order to increase search performance and/or to reduce the load caused by performing the search. Accordingly, the subsequently described steps, in accordance with one or more embodiments of the technology, when executed, reduce the number of search index fragments by combining small search index fragments, e.g., search index fragments that were generated as described in FIG. 2, into larger but fewer search index fragments. The merging may continue until the number of search index fragments in the document search index has been reduced to the target value. The target value may be obtained either experimentally, based on performance measurements, based on specific requirements and/or assumptions. Those skilled in the art will appreciate that other method for setting the target value for the number of search index fragments do exist.

In Step 302, a maximum merge threshold is obtained. The maximum merge threshold, in accordance with one or more embodiments of the technology, limits the number of search index fragments that may be merged, in a single merge operation. Limiting the number of search index fragments to be merged at once, in accordance with an embodiment of the technology, avoids performance bottlenecks that may be caused by excessive input/output operations resulting from simultaneously accessing many small search index fragments. Based on the maximum merge threshold, a merging operation may be split into multiple consecutive merge operations, each of which is performed on a number of search index fragments that is limited to the value specified by the maximum merge threshold. The value specified by the maximum merge threshold may be obtained either experimentally, based on performance measurements, based on specific requirements and/or assumptions. Those skilled in the art will appreciate that other method for setting the maximum merge threshold do exist.

In Step 304, a determination is made about whether the number of search index fragments in the document search index is above the target value for the number of search index fragments, specified in Step 300. The number of search index fragments may increase, for example, as the method described in FIG. 2 is executed. If the number of search index fragments is below the target value, the method may remain in Step 304. If the number of search index fragments is above the target value, the method may proceed to Step 306. Alternatively, the number of search index fragments may be required to increase above the target value by a certain amount, e.g., by 100 or 1,000, before the method may proceed to Step 306.

In Step 306, search index fragments in the document search index are merged into larger but fewer search index fragments, as described in detail below with reference to FIG. 4.

FIG. 4 shows a method for merging smaller search index fragments into larger search index fragments, in accordance with one or more embodiments of the technology. Execution of the method of FIG. 4 results in a reduction of the number of search index fragments in the document search index.

In Step 400, the search index fragments in the document search index are identified by size. The size of a search index fragment may be the file size of the search index fragment, the number of indexing terms in the search index fragment or any other measure suitable for quantifying size.

In Step 402, a set of smallest search index fragments is selected from the search index fragments identified in Step 400. The selected set of smallest search index fragments is subsequently merged into a single larger search index fragment, as described in the following steps. A set of smallest search index fragments to be merged may include any number of search index fragments. However, in one embodiment of the technology, an upper limit of the number of smallest search index fragments is implicitly specified by the target value for the number of search index fragments in the document search index, specified in Step 200. Consider a scenario in which the target value of search index fragments is "5". Further, assume that the document search index includes 500 search index fragments. Accordingly, selecting a set of 500 smallest search index fragments, in Step 402, would result in only a single rather than five search index fragments, after the merge operation. Accordingly, a smaller number of smallest search index fragments may be chosen. In the above scenario, 100 search index fragments may be chosen.

In Step 404, a hierarchical structure suitable for accommodating the search index fragments, selected in Step 402, is constructed. The development of the hierarchical structure, in accordance with an embodiment of the technology, does not involve an actual rewriting and/or moving of the search index fragments, but instead is limited to logically organizing the search index fragments in the hierarchical structure. The hierarchical structure, in one embodiment of the technology, is a Huffman tree in which search index fragments are hierarchically organized based on their size. Alternatively, any other hierarchical structure capable of organizing search index fragments based on size may be used. An exemplary arrangement of search index fragments in a Huffman tree is shown in FIGS. 5C1-5D3. Those skilled in the art will appreciate that Huffman trees, in accordance with an embodiment of the technology, are built starting from lowest frequency elements (here: the smallest size index fragments) at the bottom layer of the Huffman tree, and with increasingly higher frequency elements (here: larger size search index fragments) being added to higher-level layers of the Huffman tree. The construction of the Huffman tree is further illustrated below, with reference to the exemplary Huffman tree shown in FIGS. 5C1-5D3.

In Step 406, a determination is made about whether identified search index fragments are remaining. Identified search index fragments may be remaining if, as previously discussed, not all of the search index fragments identified in Step 400 were included in the hierarchical structure, as described in Steps 402 and 404. If a determination is made that identified search index fragments are remaining, the method may return to Step 402. During subsequent executions of Steps 402 and 404, the remaining search index fragments may be included in additional hierarchical structures. If no identified search index fragments are remaining, the method may proceed to Step 408.

In Step 408, a hierarchical structure is selected. As previously discussed, multiple hierarchical structures may exist, if Steps 402 and 404 have been executed multiple times.

In Step 410, some or all of the search index fragments that are arranged in the selected hierarchical structure are merged to form a single, larger search index fragment. If the hierarchical structure includes a number of search index fragments that exceeds the maximum merge threshold, only a number of search index fragments up to the maximum merge threshold is merged. The search index fragments being merged are selected to include the smallest search index fragments. If the hierarchical structure is a Huffman tree, the bottommost entries of the Huffman tree, representing the smallest search index fragments, are selected. The merge is performed by combining the content of the search index fragments, e.g., indexing terms, counts associated with the indexing terms, document identifiers, etc. in a newly created, larger search index fragment. After completion of the merge, the original search index fragments that were merged may be deleted from the document search index.

In Step 412, a determination is made about whether non-merged search index fragments are remaining in the hierarchical structure. Non-merged search index fragments may be remaining if the hierarchical structure includes a number of search index fragments that exceeds the maximum merge threshold. If non-merged search index fragments are remaining, the method may return to Step 408 to merge additional search index fragments. Steps 410 and 412 may be repeated until all of the original search index fragments in the hierarchical structure have been merged into a single larger search index fragment. If no non-merged search index fragments are remaining, the method may proceed to Step 414.

In Step 414, a determination is made about whether additional hierarchical structures are remaining. If additional hierarchical structures are remaining, the method may return to Step 408 to select one of the remaining hierarchical structures for which Steps 410-414 may then be repeated.

The following use case scenarios are intended to provide examples of the methods for managing a document search index. The methods described by FIGS. 2-4 are not limited to the subsequently described use cases.

Use Case I: Conventional Step-Wise Merging of Search Index Fragments

Consider a scenario in which nine search index fragments exist in the document search index, as illustrated in FIG. 5A. Each of the search index fragments in FIG. 5A is labeled with the size of the search index fragment. Assume that the size is expressed in kilobytes (kb), although any other metric for size may be used. Further, the target value for the number of search index fragments in the document search index is set to "5".

FIGS. 5B1-5B4 illustrate the step-wise merging of the search index fragments. FIG. 5B1 shows the search index fragments in the document search index after a first merge operation has been completed. In the first merge operation, the smallest search index fragments (size: 1 kb and 1 kb) of the search index fragments shown in FIG. 5A were merged into a single search index fragment (size: 2 kb). Accordingly, eight search index fragments are remaining.

FIG. 5B2 shows the search index fragments in the document search index after a second merge operation has been completed. In the second merge operation, the smallest search index fragments (size: 2 kb and 2 kb) of the search index fragments shown in FIG. 5B1 were merged into a single search index fragment (size: 4 kb). Accordingly, seven search index fragments are remaining.

FIG. 5B3 shows the search index fragments in the document search index after a third merge operation has been completed. In the third merge operation, the smallest search index fragments (size: 3 kb and 4 kb) of the search index fragments shown in FIG. 5B2 were merged into a single search index fragment (size: 7 kb). Accordingly, six search index fragments are remaining.

FIG. 5B4 shows the search index fragments in the document search index after a fourth merge operation has been completed. In the fourth merge operation, the smallest search index fragments (size: 5 kb and 4 kb) of the search index fragments shown in FIG. 5B3 were merged into a single search index fragment (size: 9 kb). Accordingly, five search index fragments are remaining.

As the number of search index fragments has reached the target value for the number of search index fragments, no further merging is performed. Tracking the file size (and the resulting input/output traffic) of the search index fragments having been created in the above scenario, a total of 2 kb+4 kb+7 kb+9 kb=22 kb were written.

Use Case II: Single-Step Merging Using a Huffman Tree, in Accordance with an Embodiment of the Technology Consider, again, a scenario in which nine search index fragments exist in the document search index, as illustrated in FIG. 5A. Further, the target value for the number of search index fragments in the document search index remains set to "5".

FIG. 5C1 shows Huffman trees that are being used to arrange the search index fragments shown in FIG. 5A. Note that although a particular Huffman tree configuration is shown in FIG. 5C1, other Huffman tree configurations could have been employed. For example, in the displayed configuration, the majority of index fragments is located in one large Huffman tree (including index fragments of size 1 kb, 1 kb, 2 kb, and 3 kb), and in one small Huffman tree (including index fragments of size 4 kb and 5 kb), whereas in an alternative configuration, the index fragments could have been distributed in a different manner.

In the Huffman trees, the search index fragments are represented by solid rectangles. Based on the hierarchical characteristics of Huffman trees, the search index fragments are arranged by size in an ascending order. Virtual elements (dashed line rectangles) are added to connect the search index fragments. For example, a 2 kb virtual element is added for the combination of the two 1 kb search index fragments at the bottom of the first Huffman tree, a 4 kb virtual element is added for the combination of the two 2 kb elements, etc. The first Huffman tree, established during a first execution of Step 408, terminates in a single 7 kb virtual element. The second Huffman tree, established during a second execution of Step 408, terminates in a single 9 kb virtual element that combines the 5 kb and the 4 kb search index fragments.

The remaining search index fragments with the sizes 8 kb, 10 kb, and 20 kb are individually represented, without Huffman trees. Accordingly, the top level hierarchy of the Huffman tree configuration includes the search index fragments with the sizes 8 kb, 10 kb, and 20 kb (solid line rectangles), and the virtual elements with the sizes 7 kb and 9 kb (dashed line rectangles), as shown in FIG. 5C1. By merging the elements in the Huffman trees when executing Step 410 for the first and for the second Huffman trees, the five search index fragments displayed in FIG. 5C2 are obtained.

Tracking the file size (and the resulting input/output traffic) of the search index fragments having been created in the above scenario, only 7 kb+9 kb=16 kb were written, because all search index fragments in both Huffman trees are merged in single-step operations without generating intermediate search index fragments. Accordingly, the method described in use case II, in accordance with an embodiment of the technology results in a performance increase over the conventional method described in use case I. Experimental results have shown that an improvement of approximately 30% can be achieved by using single-step merging, in accordance of an embodiment of the technology, rather than the conventional method based on step-wise merging. The improvement is a result of the reduction in write operations during the merging.

Use Case III: Single-Step Merging Using a Huffman Tree and Using a Maximum Merge Threshold, in Accordance with an Embodiment of the Technology Consider the first Huffman tree of use case scenario II and further assume that the maximum merge threshold is set to "3", i.e., only three merges may be performed in a single merge operation. FIG. 5D1 reproduces the first Huffman tree prior to performing merge operations. FIG. 5D2 shows the first Huffman tree after three search index fragments (two 1 kb search index fragments and one 2 kb search index fragment) have been merged. FIG. 5D3 shows the first Huffman tree after the remaining merges have been completed. FIG. 5D4 shows experimental merge performance results. Merge performance values were obtained for different maximum merge threshold values. The resulting curve shows that merge performance initially increases as the maximum merge threshold value is increased, peaks, and subsequently decreases as the maximum merge threshold is further increased. Accordingly, an optimum value exists for the maximum merge threshold. This optimum value may depend, for example, on the type of computing system being used and/or the characteristics of the search index fragments to be merged.

Embodiments of the technology may enable a system to manage a document search index. A document search index that includes a desired number of search index fragments may be established from many search index fragments. The generation of the document search index is performed in an effective manner using a single-step merging approach, thus requiring only a limited number of file system operations and thereby increasing performance and reducing computing system load.

Figure 6:
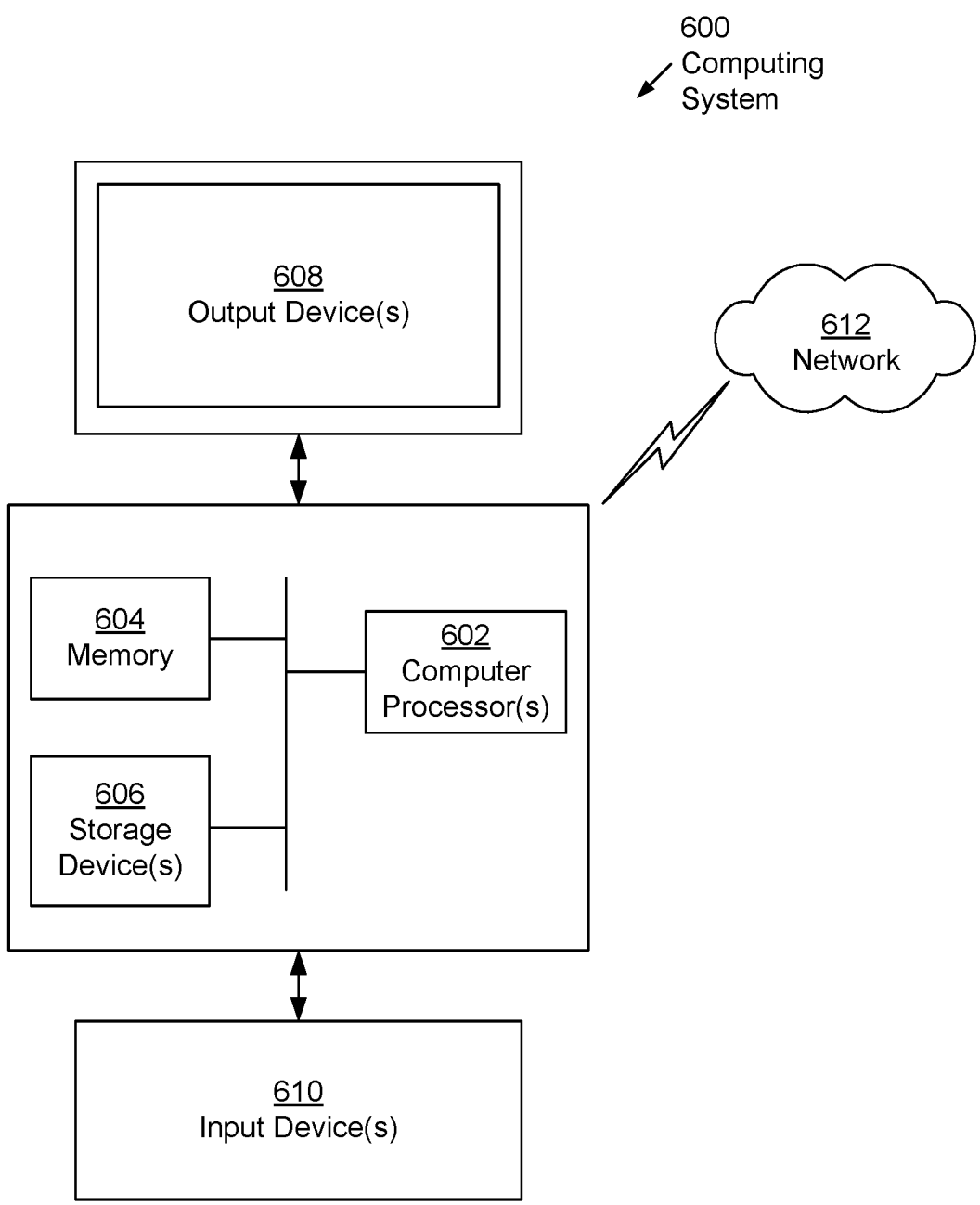
FIG. 6 shows a computing system in accordance with one or more embodiments of the technology.

Embodiments of the technology may be implemented on a computing system. Any combination of mobile, desktop, server, embedded, or other types of hardware may be used. For example, as shown in FIG. 6, the computing system (600) may include one or more computer processor(s) (602), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores, or micro-cores of a processor. The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (600) may be connected to a network (612) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code, that when executed by a processor(s), is configured to perform embodiments of the technology.

Further, one or more elements of the aforementioned computing system (600) may be located at a remote location and connected to the other elements over a network (612). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method for managing a document search index, comprising:
   obtaining indexing terms for documents in a document repository to generate a plurality of search index fragments;
   storing the plurality of search index fragments in the document search index;
   constructing a hierarchical structure from a first plurality of stored search index fragments, wherein the first plurality of stored search index fragments is arranged by size in the hierarchical structure and wherein the hierarchical structure comprises at least one virtual element that connects at least two of the first plurality of stored search index fragments in the hierarchical structure;

selecting, based on a minimal size, a second plurality of stored search index fragments from the hierarchical structure;

merging the second plurality of stored search index fragments to obtain a larger search index fragment, wherein the at least one virtual element comprises the larger search index fragment;

storing the larger search index fragment in the document search index; and serving at least one search request using the larger search index fragment.

2. The method of claim 1, wherein a cardinality of the first plurality of stored search index fragments is governed by a target value of the stored search index fragments in the document search index.

3. The method of claim 1, wherein the hierarchical structure is a Huffman tree, and wherein the first plurality of stored search index fragments is organized, in the Huffman tree, by search index fragment size.

4. The method of claim 1, wherein merging the second plurality of stored search index fragments comprises:
obtaining indexing terms from each of the stored search index fragments in the second plurality of search index fragments; and
storing the obtained indexing terms in the larger search index fragment.

5. The method of claim 1, wherein a cardinality of the second plurality of search index fragments is governed by a maximum merge threshold that specifies a maximum number of search index fragments to be merged into the larger search index fragment.

6. The method of claim 1, further comprising:
making a determination that additional stored search index fragments are remaining, after constructing the hierarchical structure;
based on the determination:
selecting, based on minimal size of the remaining search index fragments, a third plurality of search index fragments from the stored remaining search index fragments; and
arranging the third plurality of search index fragments in a second hierarchical structure.

7. The method of claim 1, further comprising:
making a determination that after selecting the second plurality of search index fragments, non-selected search index fragments are remaining in the hierarchical structure, and based on the determination:
selecting, based on minimal size of the non-selected search index fragments, a third plurality of stored search index fragments;
merging the third plurality of stored search index fragments, to obtain a second larger search index fragment; and
storing the second larger search index fragment in the document search index.

8. The method of claim 1, further comprising:
adding a document to the document repository;
obtaining additional indexing terms for the added document; and
storing the additional indexing terms in an additional search index fragment in the document search index.

9. A non-transitory computer readable medium (CRM) comprising instructions that enable a system for managing a document search index to:
obtain indexing terms for documents in a document repository to generate a plurality of search index fragments;
store the plurality of search index fragments in the document search index;
construct a hierarchical structure from a first plurality of stored search index fragments, wherein the first plurality of stored search index fragments is arranged by size in the hierarchical structure and wherein the hierarchical structure comprises at least one virtual element that connects at least two of the first plurality of stored search index fragments in the hierarchical structure;
select, based on a minimal size, a second plurality of stored search index fragments from the hierarchical structure;
merge the second plurality of stored search index fragments to obtain a larger search index fragment, wherein the at least one virtual element comprises the larger search index fragment;
store the larger search index fragment in the document search index; and
serve at least one search request using the larger search index fragment.

10. The non-transitory CRM of claim 9, wherein the hierarchical structure is a Huffman tree, and wherein the first plurality of stored search index fragments is organized, in the Huffman tree, by search index fragment size.

11. The non-transitory CRM of claim 9, wherein merging the second plurality of stored search index fragments comprises:
obtaining indexing terms from each of the stored search index fragments in the second plurality of search index fragments; and
storing the obtained indexing terms in the larger search index fragment.

12. The non-transitory CRM of claim 9, wherein a cardinality of the second plurality of search index fragments is governed by a maximum merge threshold that specifies a maximum number of search index fragments to be merged into the larger search index fragment.

13. The non-transitory CRM of claim 9, wherein the instructions further enable the system for managing the document search index to:
make a determination that additional stored search index fragments are remaining, after constructing the hierarchical structure;
based on the determination:
select, based on minimal size of the remaining search index fragments, a third plurality of search index fragments from the stored remaining search index fragments; and
arrange the third plurality of search index fragments in a second hierarchical structure.

14. The non-transitory CRM of claim 9, wherein the instructions further enable the system for managing document search index to:
make a determination that after selecting the second plurality of search index fragments, non-selected search index fragments are remaining in the hierarchical structure, and based on the determination:
select, based on minimal size of the non-selected search index fragments, a third plurality of stored search index fragments;

merge the third plurality of stored search index fragments, to obtain a second larger search index fragment; and store the second larger search index fragment in the document search index.

15. A system for managing a document search index, the system comprising:

a document management service; and a repository server comprising a document repository and the document search index;

wherein the document management service:

obtains indexing terms for documents in the document repository to generate a plurality of search index fragments;

store the plurality of search index fragments in the document search index;

construct a hierarchical structure from a first plurality of stored search index fragments, wherein the selected first plurality of stored search index fragments is arranged by size in the hierarchical structure and wherein the hierarchical structure comprises at least one virtual element that connects at least two of the first plurality of stored search index fragments in the hierarchical structure;

select, based on a minimal size, a second plurality of stored search index fragments from the hierarchical structure;

merge the second plurality of stored search index fragments to obtain a larger search index fragment, wherein the at least one virtual element comprises the larger search index fragment;

store the larger search index fragment in the document search index; and serve at least one search request using the larger search index fragment.

16. The system for managing the document search index of claim 15, wherein the hierarchical structure is a Huffman tree, and wherein the first plurality of stored search index fragments is organized, in the Huffman tree, by search index fragment size.

17. The system for managing the document search index of claim 15, wherein merging the second plurality of stored search index fragments comprises:

obtaining indexing terms from each of the stored search index fragments in the second plurality of search index fragments; and storing the obtained indexing terms in the larger search index fragment.

18. The system for managing the document search index of claim 15, wherein a cardinality of the second plurality of search index fragments is governed by a maximum merge threshold that specifies a maximum number of search index fragments to be merged into the larger search index fragment.

19. The system for managing the document search index of claim 15, wherein the document management service further:

makes a determination that additional stored search index fragments are remaining, after constructing the hierarchical structure;

based on the determination:

selects, based on minimal size of the remaining search index fragments, a third plurality of search index fragments from the stored remaining search index fragments; and arranges the third plurality of search index fragments in a second hierarchical structure.

20. The system for managing the document search index of claim 15, wherein the document management service further:

makes a determination that after selecting the second plurality of search index fragments, non-selected search index fragments are remaining in the hierarchical structure, and based on the determination:

selects, based on minimal size of the non-selected search index fragments, a third plurality of stored search index fragments;

merges the third plurality of stored search index fragments, to obtain a second larger search index fragment; and stores the second larger search index fragment in the document search index.

* * * * *